United States Patent [19]

Yarrington

[11] Patent Number: 5,026,002
[45] Date of Patent: Jun. 25, 1991

[54] HELIHOVER AMPHIBIOUS AIRCRAFT

[76] Inventor: Arthur G. Yarrington, M.S. 1073, Crows Nest, Qld 4355, Australia

[21] Appl. No.: 283,996
[22] PCT Filed: Jun. 5, 1987
[86] PCT No.: PCT/AU87/00168
 § 371 Date: Oct. 4, 1988
 § 102(e) Date: Oct. 4, 1988
[87] PCT Pub. No.: WO88/00898
 PCT Pub. Date: Feb. 11, 1988

[30] Foreign Application Priority Data

Jun. 13, 1986 [AU] Australia .................... PH6401

[51] Int. Cl.$^5$ ............................................. B64C 29/00
[52] U.S. Cl. ............................. 244/12.1; 244/17.11; 244/23 B
[58] Field of Search ............... 244/2 R, 12.1, 17.11, 244/100 A, 23 R, 105, 12.3, 23 B, 45 R; 180/116

[56] References Cited

U.S. PATENT DOCUMENTS

| | | | |
|---|---|---|---|
| 2,969,937 | 1/1961 | Trojahn | 244/23 R |
| 3,070,327 | 12/1962 | Dornier et al. | 244/12.1 |
| 3,116,898 | 1/1964 | Clark et al. | 244/23 B |
| 3,175,785 | 3/1965 | De Tore et al. | 244/2 |
| 3,184,183 | 5/1965 | Piasecki | 244/23 B |
| 3,265,329 | 8/1966 | Apostolescu | 244/23 R |
| 3,279,554 | 10/1966 | Hunt | 244/23 B |
| 3,481,559 | 12/1969 | Apostolescu | 244/2 |
| 3,627,235 | 12/1971 | Lippisch | 244/12.1 |
| 4,067,516 | 1/1978 | Dobb | 244/17.11 |
| 4,159,086 | 6/1979 | Schonfelder | 244/105 |

Primary Examiner—Joseph F. Peters, Jr.
Assistant Examiner—Anne E. Bidwell
Attorney, Agent, or Firm—Armstrong, Nikaido, Marmelstein, Kubovcik and Murray

[57] ABSTRACT

Amphibious aircraft having an aerodynamic wing attached to a main fuselage with a centrally positioned channel flow tunnel under the middle thereof. At least one large diameter in-fuselage ducted fan assembly is housed in a duct extending through the fuselage. At least one main helicopter-like rotary assembly provided on a supporting superstructure above the main fuselage. A tail is connected to the main fuselage and has areas appropriate anti-torque mechanisms. A common drive assembly is operatively linked to the fan assembly, the helicopter-like rotary assembly, and the anti-torque device.

8 Claims, 1 Drawing Sheet

HELIHOVER AMPHIBIOUS AIRCRAFT

The invention relates to a vehicle or craft which combines the functions of the helicopter and the aerodynamic winged hull to produce an amphibious aircraft capable of vertical take-off and translational flight, able to descend and land on virtually any type of terrain and to travel on or near the surface of land, swamp, water, snow, and ice as a surface effect amphibian in a safe efficient and exceptionally smooth, stable manner. The invention incorporates a stream-line aerodynamic winged hull fuselage with one or an arrangement of large circuliar ducts passing right through fuselage body so formed within this main fuselage. Set within the confines of these ducts are one or more lift rotors mounted with a vertical axis alignment, Additionally, top mounted helicoptor lift and flight rotor or rotors are provided. The upper lift and propulsion rotor or rotors and tail rotor or rotors are arranged in a helicopter configuration. Depending on the specific application, the device can incorporate on-deck propulsion thrusters for additional thrust for flight and close surface travel, and can have below deck water engaging propellers or thrusters for water propulsion. The invention has been devised to provide a novel form of amphibious aircraft, capable of maneuvering over inhospitable terrain and able to operate efficiently in flight as wing in-ground effect over land, swamp, snow, ice or water, to operate in the "in-ground" effect or in elevated flight within the usual helicopter altitude ceilings, capable of carrying substantial loading over sea or land masses.

The device can be produced in an economical manner and readily put into service. One of the important advantages of this invention is the ability of this craft to carry heavy loads and economically travel long distances close to water or unprepared land, snow or ice when operating in wing, "in-ground effect", and yet be able to lift over any obstacle when required, such as, over bars, breaking surf, reefs or rocky shores, cliffs or steep shore lines, and land safely on any suitable flat land, snow, ice or water. The device has the ability to operate as an effective vessel in the open sea, over long distances, providing safe night transport. The transport of cargo over distances with conventional helicopters is uneconomical and limited by fuel capacities. Power input is greatly reduced using this invention in "in-ground" effect transport mode. The device would have a wide application of use providing a completely new concept of air, land and water transport with extensive military, tourist, rescue, arctic exploration, agriculture and commercial and defence applications.

Further advantages will be apparent from the following description:

According to the invention the device consists of a lower flat or formed main fuselage body in the form of a stream-lined aerodynamic shape supporting the main helicopter like rotor assembly and having a rotor fan assembly within a vertical duct through the fuselage. The drive engines are mounted on or within this body, either centrally located on the rotor axis, amidship or at either side of fuselage or at the rear, adjacent to any propulsion or tail rotor assembly. The control, passenger and cargo superstructure are located at the forward or bow position of the fuselage body and at the rear or aft position depending on requirements of model. Translational flight is accomplished by the cyclic pitch control of the main lift rotor or rotors, which also provide manoeuvrability in conjunction with collective pitch control lever.

Complimentary lift and propulsion is provided by the lower in-fuselage duct mounted rotor or rotors. Radial struts or formed superstructure rising from the main fuselage, support the vertical central single or contrarotating rotor assembly which are driven from engines mounted within this assembly or from engines mounted on or within main fuselage assembly.

The higher top single or contrarotating rotor or rotors are mounted so as to be well above the lower main fuselage housing the lower lift rotor or rotors. On the same vertical axis below these main lift and propulsion rotor or rotors, located within the confines of the mouth of the fuselage duct, a separate rotor or rotors are provided to provide lift and propulsion air for assistance in take-off or decent of the craft. The top rotor assembly provides the main vertical lift and acts as the main stabilizing influence in hover. The main helicopter like rotor assembly in conjunction with the deflected thrust from the in-fuselage rotor fan provide the thrust for transitional flight.

Tail rotor or rotors or thrusters attached at the rear or on each side of main fuselage are incorporated to equalize rotational torque of main fuselage and assist in control.

Inbuilt static bouyancy is provided within the main fuselage construction to support the craft when at rest on water. Craft can be produced in various configurations depending on application, using single ducted fuselage or multiducted fuselage using an array of ducts and helicopter lift and propulsion assemblies arranged in tandem or quad formation incorporating various rotor or thruster arrangements such as contra rotating rotor head assemblies either with meshing or non-meshing rotors. Units can be equipt with retractable propellors or water jets for propulsion on water, or fitted with retractable land contact wheels or tracks for ground or snow travel with hover cushion lift assistance to lower ground contact pressures. Various configurations and designs of air cushion skirts can be incorporated on the underside of main fuselage to provide an efficient hover air cushion base if required in specific models. Known aircraft capable of flying close to the surface as wing-in ground effect machines are limited in their landing and take-off ability by the condition of the surface of the water or land due to the fact that forward movement has to be effected to a stage where the airfoil acted on by the aerodynamic forces lifts the craft into transitional flight. This speed is usually dependent on type of aircraft between 35 to 75 knots/hr whereas with the present invention, the craft is able to lift off and land vertically, with no forward movement. This is of great advantage in difficult surface conditions and when in flight the system allows speed to vary right down to a stationary hover. The fuel to load advantage of this craft in ground effect is significantly more economical than conventional aircraft. While flying in ground effect the image flow reduces induced drag by 70%. The craft can climb out of in-ground effect to navigate over obstacles such as bridges and steep terrain. Other paramount advantage is the tight maneuvering facility the helicopter like rotors provide by the use of collective and cyclic pitch controls. Affixed to the lower wing tip areas are landing or water supporting means such as wheels, skids, floats, bouyancy hulls, air cushion support hulls or pads. The invention will now be shown in the accompanying drawings where in FIG. 1 shows a preferred arrangement using the art of the invention as applied to produce an improved amphibious aircraft able to make vertical take-offs and landings and fly in-ground effect, also performing all the manouvers of a conventional helicopter.

DETAILED DESCRIPTION OF EMBODIMENT WITH REFERENCE TO DRAWINGS

Figure 1:
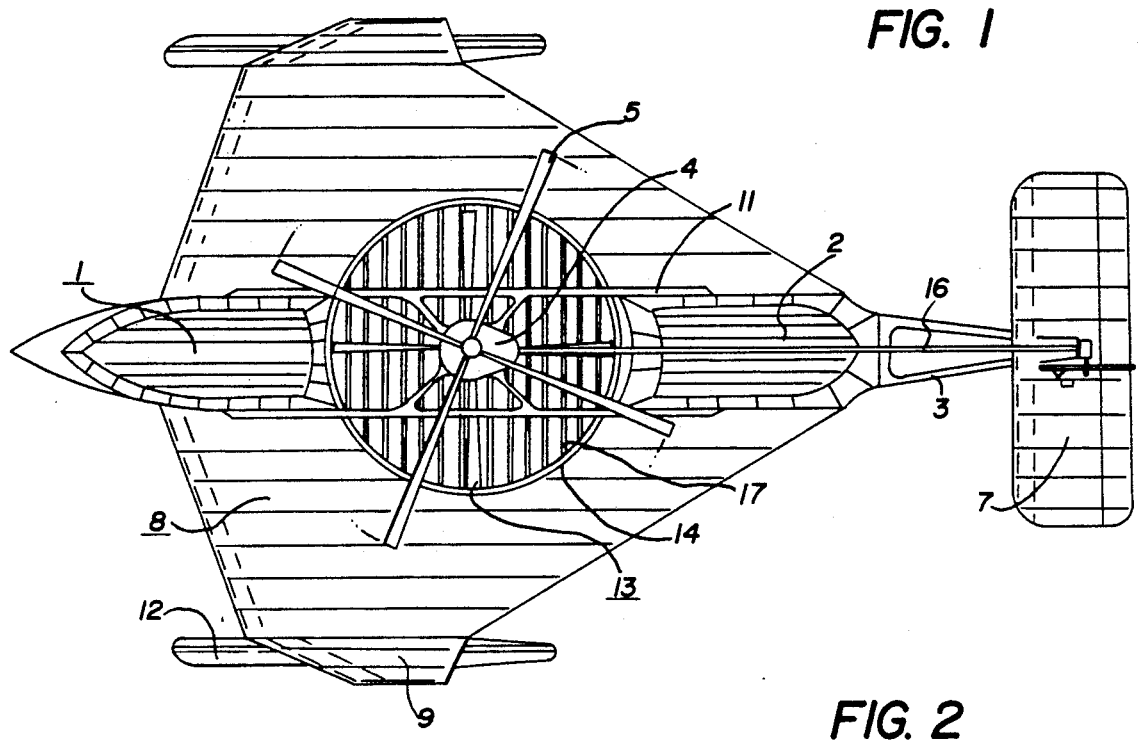
Figure 2:
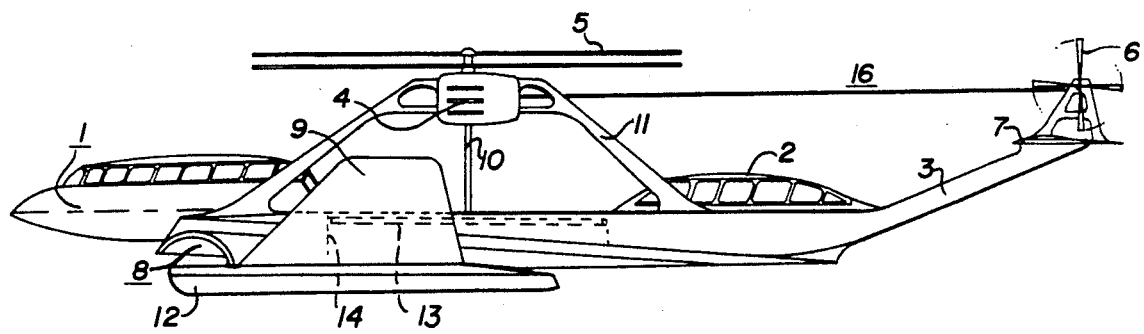
Figure 3:
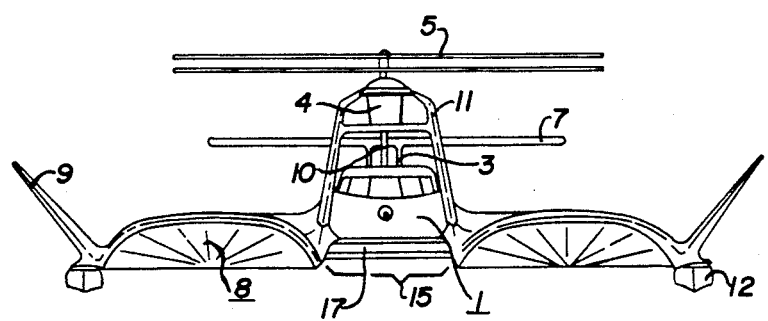

FIGS 1, 2, and 3 show a craft in plan, side and front elevation respectively.

The figures show a low aspect ratio aerodynamic wing as a combination reverse delta parawing 8 with a central fuselage integrally supporting the above deck superstructure 11 mounting the helicopter rotors power module 4 and main helicopter like variable pitch rotor assembly 5. Viewing from the front view, FIG. 1 shows the central channel flow tunnel 15 formed in the main central fuselage, passing back towards the rear of the craft under control cabin 1 under vertical duct 14 housing variable pitch rotor fan 13 to the under surface of aft cabin 2. The ceiling or upper surface of this channel slopes down approximately 3°-5° to provide induced lift from in-ground aerodynamic forces when the craft is in motion. Positioned as part of the roof of this channel 15 are mounted the adjustable deflector blades 17 which direct thrust air generated by the variable pitch lower rotor fan 13 either straight down for vertical take-off or descent, or directed back as a thrust stream against the main inground compressed air stream during surface motion and transitional flight. This lower variable pitched rotor fan 13 is mounted in the same axial alignment as the top main heli-rotors, 5 and is driven locked-in with the main rotor assembly 5 where together with rear mounted anti-torque tail rotor or jet thruster. The craft during aerostatic operation when in the take-off or landing mode of VTOL, utilizes the powerful down draft thrust stream from the lower rotor fan 13 combined with the controlled lift of the top mounted heil-rotor assembly 5 to provide exceptional stability and control. On the craft being lifted to a suitable altitude process of forward flight is instituted in two steps. First, adjustment of collective and cyclic pitch controls of top heli-rotor assembly 5 changes the mode to forward flight followed by tilting of lower in-fuselage rotor deflector blades 17 to angle air thrust from the lower rotor fan 13 to the rear of channel flow tunnel 15. Once sufficient forward velocity has been attained, full aerodynamic support of the craft is reached as the generated aerodynamic forces act on the boom parawings 8 and the channel flow tunnel 15 with compensating thrust support from lower inboard rotor fan 13 through deflector blades 17. These flow aerodynamic forces, when fully supporting the aircraft on in-ground effect, allow full power from engines to be applied to thrust for translational flight to sustain worthwhile economies in the order of 50% less power required in-ground effect, enabling operations in excess of 50 ton miles per gallon of fuel at speeds in the 90–180 kts range with maneuverability being provided by the combination of rotor collective and cyclic pitch adjustments in conjunction with tail rotor control. Tail rotor or thruster jet unit 6 can be direct shaft 16 driven from main gear box or can be driven by coupled hydraulic motor driven from main power source 4.

To those skilled in the art to which this invention relates; many changes in construction, design and widely differing embodiments and applications of the invention will suggest themselves without departing from the spirit and scope of the invention. The disclosures and the descriptions herein are pure to be in any sense limiting or being restricted to a precise form.

I claim:

1. An amphibious aircraft capable of V.T.O.L. (vertical take-off and landing) modes, hover and translational flight in and out of ground effect, comprising:

a winged main fuselage defined by an aerodynamic wing and having a duct extending through said fuselage and a lower portion including a centrally positioned channel flow tunnel;

at least one large diameter in-fuselage ducted downdraft variable pitch rotor fan assembly housed within said duct in said main fuselage;

at least one main helicopter-like rotor assembly having variable pitch, collective pitch and cyclic pitch modes mounted directly above said at least one fan assembly;

a supporting superstructure extending from said main fuselage and connected to said helicopter-like rotor assembly for supporting said helicopter-like rotor assembly well clear of said main fuselage;

a tail connected to said main fuselage, said tail having an anti-torque tail propulsion means; and a common drive assembly operatively linked to said at least one fan assembly, said at least one helicopter-like rotor assembly, and said anti-torque tail propulsion means.

2. An aircraft according to claim 1, including control means for maintaining compatible pitch adjustments between said at least one fan assembly and said at least one helicopter-like rotor assembly, and for controlling said antitorque tail propulsion means to maintain aircraft stability.

3. An aircraft according to claim 2, including controlled adjustable deflector blades positioned below said duct fan assembly for controlling flow through said duct, said duct extending from an upper surface of said fuselage to said channel flow tunnel provided through a lower portion of said main fuselage.

4. An aircraft according to claim 1, including controlled adjustable deflector blades positioned below said duct fan assembly for controlling flow through said duct, said duct extending from an upper surface of said fuselage to said channel flow tunnel provided through a lower portion of said main fuselage.

5. An aircraft according to claim 1, wherein said supporting superstructure is streamlined, and includes a base portion bridging the duct through said main fuselage.

6. An aircraft according to claim 1, wherein said common drive assembly operatively links said at least one duct fan assembly, said at least one helicopter-like rotor assembly, and said anti-torque tail propulsion means by direct shaft.

7. An aircraft according to claim 1, wherein said aerodynamic wing is a reverse delta wing having negative dihedral, said reverse delta wing having outer wing tips provided with wing-lets and catamaran type hulls.

8. An aircraft according to claim 1, wherein said aerodynamic wing is a twin boom parawing, said parawing having outer wing tips supporting wing-lets and catamaran type hulls.

* * * * *

UNITED STATES PATENT AND TRADEMARK OFFICE
CERTIFICATE OF CORRECTION

PATENT NO. : 5,026,002

DATED : June 25, 1991

INVENTOR(S) : Arthur G. YARRINGTON

It is certified that error appears in the above-identified patent and that said Letters Patent is hereby corrected as shown below:

On the cover page, Item [76], "M.S. 1073, Crows Nest, Qld 4355, Australia" should read -- Crows Nest, Queensland, Australia --.

Signed and Sealed this

Ninth Day of February, 1993

Attest:

STEPHEN G. KUNIN

*Attesting Officer*  Acting Commissioner of Patents and Trademarks